(12) United States Patent
Matsuoka et al.

(10) Patent No.: US 10,414,255 B2
(45) Date of Patent: Sep. 17, 2019

(54) SUNROOF DEVICE FOR VEHICLE

(71) Applicant: AISIN SEIKI KABUSHIKI KAISHA, Kariya-shi, Aichi-ken (JP)

(72) Inventors: Koji Matsuoka, Kariya (JP); Hiroyuki Noda, Anjo (JP); Shintaro Katsura, Northville, MI (US); Ryuuta Fukada, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 45 days.

(21) Appl. No.: 15/746,056

(22) PCT Filed: Jun. 30, 2016

(86) PCT No.: PCT/JP2016/069410
§ 371 (c)(1),
(2) Date: Jan. 19, 2018

(87) PCT Pub. No.: WO2017/014019
PCT Pub. Date: Jan. 26, 2017

(65) Prior Publication Data
US 2018/0208031 A1    Jul. 26, 2018

(30) Foreign Application Priority Data

Jul. 23, 2015   (JP) ................. 2015-145907

(51) Int. Cl.
*B60J 7/057*   (2006.01)
*B60J 7/043*   (2006.01)

(52) U.S. Cl.
CPC ........... *B60J 7/0573* (2013.01); *B60J 7/0435* (2013.01)

(58) Field of Classification Search
CPC ........ B60J 7/0435; B60J 7/057; B60J 7/0573; B60J 7/053
USPC .............................. 296/216.03, 216.05, 223
See application file for complete search history.

(56) References Cited

U.S. PATENT DOCUMENTS

| | | | | |
|---|---|---|---|---|
| 8,882,187 B2 * | 11/2014 | Katsura | ................... | B60J 7/043 296/216.03 |
| 9,248,726 B2 * | 2/2016 | Katsura | ................... | B60J 7/024 |
| 9,321,334 B2 * | 4/2016 | Katsura | ................... | B60J 7/024 |

(Continued)

FOREIGN PATENT DOCUMENTS

JP      2013-184648      9/2013

*Primary Examiner* — Dennis H Pedder
(74) *Attorney, Agent, or Firm* — Finnegan, Henderson, Farabow, Garrett & Dunner, LLP

(57) ABSTRACT

A vehicle sunroof apparatus includes check mechanisms each including a rotary cam and a fixed cam. The fixed cam includes a switch guide which switches the check mechanism between an engaged state and a disengaged state. The switch guide allows advancement of the rotary cam which is at an advancement and retraction rotary position, pushes the rotary cam to a first rotary position, and further pushes the rotary cam to a second rotary position, the check mechanism is thereby switched to the engaged state. The switch guide pushes the rotary cam to a release preparation position, further pushes the rotary cam to the advancement and retraction rotary position, the check mechanism is thereby switched to the disengaged state. The fixed cam includes an initialization guide that pushes the rotary cam to the release preparation position.

3 Claims, 4 Drawing Sheets

(56) References Cited

U.S. PATENT DOCUMENTS 9,511,653 B2 * 12/2016 Ide .......................... B60J 7/024
2013/0264845 A1 10/2013 Katsura et al.

* cited by examiner

SUNROOF DEVICE FOR VEHICLE

CROSS-REFERENCE TO RELATED APPLICATIONS

This application is a national phase application of International Application No. PCT/JP2016/069410, filed Jun. 30, 2016, and claims the priority of Japanese Application No. 2015-145907, filed Jul. 23, 2015, the content of both of which is incorporated herein by reference.

TECHNICAL FIELD

The present invention relates to a sunroof apparatus for a vehicle.

BACKGROUND ART

Conventionally, as a sunroof apparatus for a vehicle, a sunroof apparatus for a vehicle described in Patent document 1 is known, for example. A movable panel of this sunroof apparatus for a vehicle is linked to a sliding member driven by an electric motor to move in a front-and-rear direction of a vehicle. As the sliding member moves relative to the movable panel, a tilt operation is performed, and as the movable panel and the sliding member move integrally with each other, a posture is maintained. At the most front position of a movable range which mechanically restricts the sliding member from moving, between the movable panel and the sliding member, a check mechanism (an engagement and disengagement switch mechanism) is interposed which switches alternately between a state where the sliding member is movable relative to the movable panel and a state where the movable panel and the sliding member are movable integrally with each other. A state of the check mechanism when the sliding member is movable relative to the movable panel is referred to as "a disengaged state" and a state of the check mechanism when the movable panel and the sliding member are movable integrally with each other is referred to as "an engaged state".

FIG. 7 is an explanation diagram of the check mechanism of the Patent document 1 which is developed in a circumferential direction for explaining an operation of the check mechanism. As illustrated in the diagram, the check mechanism is configured to include a rotary cam 91 and a fixed cam 92. The rotary cam 91 is supported to be movable integrally with the movable panel in a front-and-rear direction of a vehicle in a state where the rotary cam 91 allows the movable panel to perform a tilt operation, and is rotatable bout an axis line extending in the front-and-rear direction. The fixed cam 92 is supported by a sliding member at a rear side of the vehicle relative to the rotary cam 91 to be substantially coaxial with the rotary cam 91.

The rotary cam 91 includes rotary cam teeth 91a each of which includes a substantially isosceles trapezoid shape of which the long side and the short side extend in the front-and-rear direction of the vehicle. The rotary cam tooth 91a extends in a range of an angle (45 degrees) which is smaller than a predetermined angle (90 degrees in the embodiment) in a circumferential direction centered on the axis line of the rotary cam 91.

On the other hand, the fixed cam 92 includes a first fixed cam 93 and a second fixed cam 94 which are overlapped with each other in the front-and-rear direction of the vehicle. Plural fixed cam teeth 93a, each of which includes a substantially triangular tooth shape, are formed at a front end portion (an opening end portion) of the first fixed cam 93 so to be arranged about an axis line of the first fixed cam 93 at every predetermined angle (90 degrees) so as to protrude and recess in the direction of the axis line. Open portions 94a communicating along a direction of an axis line of the second fixed cam 94 are formed, as a pair, at an inner peripheral portion of the second fixed cam 94 so as to face in a radial direction (that is, at every 180 degrees). A rear end portion of each of the open portions 94a at the upper side when viewed in the diagram forms a guide portion 94b inclined to be gradually widened towards a rear end. The open portion 94a communicating over the entire length of the second fixed cam 94 in the direction of the axis line extends in a range of the same angle (45 degrees) as the rotational cam tooth 91a in the circumferential direction centered on the axis line of the fixed cam 92, and the open portion 94a including the guide portion 94b extends in the range of the predetermined angle (90 degrees) in the circumferential direction.

Further, at a rear end portion (an opening end portion) of the second fixed cam 94, engagement portions 94c are formed, as a pair, between the open portions 94a in the circumferential direction so as to be inclined towards a front side of the vehicle as they go from the open portions 94a towards the guide portions 94b. Each of the engagement portions 94c extends in the range of the predetermined angle (90 degrees) in the circumferential direction about the axis line of the fixed cam 92. Both apexes of the fixed cam tooth 93a at which the fixed cam tooth 93a changes the direction in the front-and-rear direction face, in the front-and-rear direction, a circumferentially intermediate portion of the corresponding engagement portion 94c.

In a state where the rotary cam 91 and the fixed cam 92 are separated from each other in the front-and-rear direction of the vehicle, the rotary cam teeth 91a are at an advancement and retraction rotary position which coincides with an angular position of the open portions 94a. Thus, when the fixed cam 92 moves towards the front side of the vehicle relative to the rotary cam 91 in this state, the rotary cam teeth 91a pass the open portions 94a, and are pushed by the fixed cam teeth 93a, and accordingly rotate. Thereafter, when the fixed cam 92 moves towards the rear side of the vehicle relative to the rotary cam 91, paths for the rotary cam teeth 91a to advance to the fixed cam teeth 93a (paths to retract from the fixed cam teeth 93a) are blocked by the engagement portions 94c. Accordingly, the check mechanism comes to be in an engaged state in which the movable panel and the sliding member are movable integral with each other.

On the other hand, in the engaged state of the check mechanism when the fixed cam 92 moves towards the front side of the vehicle relative to the rotary cam 91, the rotary cam teeth 91a are pushed by the fixed cam teeth 93a, and thus rotate. Thereafter, when the fixed cam 92 moves towards the rear side of the vehicle relative to the rotary cam 91, the rotary cam teeth 91a are guided and rotated by the guide portions 94b so as to reach the advancement and retraction rotary position while the paths for the rotary cam teeth 91a to advance to the fixed cam teeth 93a (the path to retract from the fixed cam teeth 93a) are opened by the open portions 94a. Accordingly, the check mechanism comes to be in a disengaged state in which the sliding member is movable relative to the movable panel.

DOCUMENT OF PRIOR ART

Patent Document

Patent document 1: JP2013-184648A

OVERVIEW OF INVENTION

Problem to be Solved by Invention

According to Patent document 1, the check mechanisms are provided at vehicle width-direction edge portions of the movable panel as a pair. Accordingly, the states (the engaged state, the disengaged state) of the respective check mechanisms may differ from each other due to deformation of the movable panel, for example. That is, one of the check mechanisms is in the engaged state and the other is in the disengaged state (which will be hereinafter referred to also as "a one-side-engaged state). This is because both of the check mechanisms are structures that are independent from each other, and thus either one of the rotary cams 91 may rotate at an unexpected position due to an external force, for example.

Once the one-side-engaged state is established, burdensome work is needed for recovery to a normal operation, for example, by removing an electric motor and applying rework so that the states of the respective check mechanisms coincide with each other.

The purpose of the present invention is to provide a sunroof apparatus for a vehicle, which can recover to a normal operation more smoothly in a case where a state is established in which states of respective check mechanisms are different from each other.

Means for Solving Problem

A sunroof apparatus for a vehicle, which solves the above-described problem includes a movable panel opening and closing an opening formed at a roof of a vehicle, guide rails provided as a pair and respectively provided at edge portions of the opening in a width direction of the vehicle, and sliding members provided as a pair and respectively linked to edge portions of the movable panel in the width direction of the vehicle. The sliding members are driven by an electric drive source to move along the guide rails in a front-and-rear direction of the vehicle. The sliding members change a posture of the movable panel by moving relative to the movable panel and maintain the posture of the movable panel by moving integrally with the movable panel. The sunroof apparatus includes check mechanisms each including a rotary cam and a fixed cam, the rotary cams being supported at one of the respective sliding members and the respective edge portions of the movable panel, the fixed cams being supported at the other of the respective sliding members and the respective edge portions of the movable panel. Each of the rotary cams is supported to be rotatable about an axis line extending in the front-and-rear direction of the vehicle and includes an advancement and retraction rotary position set at every predetermined angle about the axis line. Each of the fixed cams includes an engagement and disengagement switch guide configured to switch each of the check mechanisms between an engaged state in which the movable panel and the sliding members are movable integrally with each other and a disengaged state in which the sliding members are movable relative to the movable panel. The engagement and disengagement switch guides are configured to allow advancement of the respective rotary cams which are at the advancement and retraction rotary position. The engagement and disengagement switch guides are configured to push the rotary cams which have advanced and to rotate the rotary cams to a first rotary position. The engagement and disengagement switch guides are configured to push the rotary cams which are to retract in a direction opposite to a direction of the advancement and to rotate the rotary cams to a second rotary position. Each of the check mechanisms is thereby switched to the engaged state when the corresponding rotary cam rotates by a half angle of the predetermined angle from the advancement and retraction rotary position to the second rotary position. The engagement and disengagement switch guides are configured to push the respective rotary cams advancing again from the second rotary position in a direction opposite to a direction of the retraction and to rotate the rotary cams to a release preparation position. The engagement and disengagement switch guides are configured to push the rotary cams which are to retract in the direction opposite to the direction of advancement and to rotate the rotary cams to the advancement and retraction rotary position. Each of the check mechanisms is thereby switched to the disengaged state. Each of the fixed cams further includes an initialization guide configured to push the rotary cam advancing further from the first rotary position and to rotate the rotary cam to the release preparation position.

According to this configuration, in a case where both of the check mechanisms are in the disengaged state and both of the sliding members move relative to the movable panel, the posture of the movable panel changes. On the other hand, in a case where both of the check mechanisms are in the engaged state and both of the sliding members move integrally with the movable panel, the movable panel moves while maintaining the posture thereof. It is assumed that both of the check mechanisms are brought into different states from each other for some reason. In this case, when both of the sliding members are moved so as to allow both of the rotary cams advanced inside the respective fixed cams to advance further, both of the rotary cams are pushed by the respective initialization guides and then reach the release preparation position. Consequently, in this state, when both the sliding members are moved to allow both of the rotary cams to retract, both the rotary cams are guided to be rotated such that both the rotary cams reach the advancement and retraction rotary position together with each other by being pushed by the respective engagement and disengagement switch guides, that is, such that both the check mechanisms come to be in the disengaged state together with each other. In other words, both of the check mechanisms come to be in the disengaged state in a synchronized manner. As described above, only by moving both of the sliding members, a normal operation can be recovered in an extremely simple manner.

Related to the above-described sunroof apparatus for a vehicle, it is ideal that each of the fixed cam includes a second initialization guide arranged between the engagement and disengagement switch guide and the initialization guide in the front-and-rear direction of the vehicle. In a case where each of the rotary cams guided by the initialization guide retracts in the direction opposite to the direction of the advancement in a state where the rotary cam has not reached the release preparation position, the second initialization guide is configured to push the rotary cam and to rotate the rotary cam to the release preparation position.

According to this configuration, even if the guiding and rotating of the rotary cams to the release preparation position by the initialization guides is incomplete at either one of the rotary cams, by moving thereafter both of the sliding members so that the both of the rotary cams are rotated reversely, both of the rotary cams are pushed by the respective second initialization guides so that both of the rotary cams are guided to rotate so as to reach the release preparation position together with each other. Thus, both of the check mechanisms can be more reliably synchronized with each other in the disengaged states.

Related to the above-described sunroof apparatus for a vehicle, it is ideal that each of the fixed cams includes a through hole, and in association with a further advancement of the rotary cams which have been rotated by the initialization guides to the release preparation position, the through holes allow at least part of the rotary cams to pass through.

According to this configuration, when each of the rotary cams, which are guided to be rotated by the respective initialization guides to the release preparation position, advances further, at least part of the rotary cam passes through the corresponding fixed cam via the through hole. Accordingly, even in a case where foreign material such as sand enters inside each of the fixed cams, the foreign material is pushed by each of the rotary cams passing through the through hole, and thus is discharged outside the fixed cam from the through hole.

Effect of the Invention

The present invention provides an effect of recovering to a normal operation more smoothly in a case where a state is established in which states of respective check mechanisms are different from each other.

MODE FOR CARRYING OUT THE INVENTION

First Embodiment

A first embodiment of a sunroof apparatus for a vehicle will be described hereafter. A front-and-rear direction of a vehicle will hereinafter be referred to as "a front-and-rear direction", and an upper side and a lower side in a height direction of a vehicle will be hereinafter referred to as "an upper side" and "a lower side", respectively.

Figure 1:
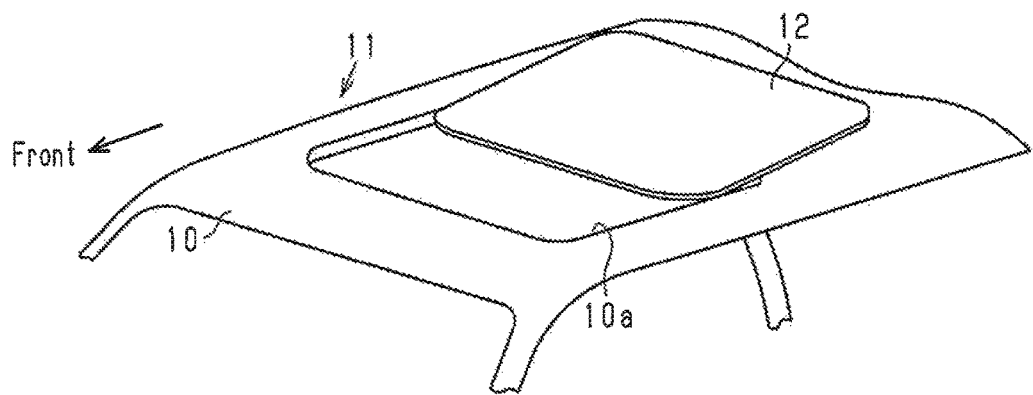
FIG. 1 is a perspective view illustrating a configuration of a first embodiment of a sunroof apparatus for a vehicle.

As illustrated in FIG. 1, an opening 10a including a substantially quadrangular shape is formed at a roof 10 of a vehicle including an automobile, and a sunroof apparatus 11 is mounted on the roof 10. The sunroof apparatus 11 is provided with a movable panel 12 including a substantially quadrangular shape and formed of, for example, glass plate. The movable panel 12 moves in the front-and-rear direction thereby to open and close the opening 10a.

The movable panel 12 is attached such that the movable panel 12 can perform a tilt-up operation during which a rear portion of the movable panel 12 moves up while a front portion of the movable panel 12 serving as a supporting point, and a slide operation in the front-and-rear direction. In an open and close operation of the opening 10a by the movable panel 12, a system of sliding in a tilt-up state, a so-called outer sliding system is employed.

Figure 2:
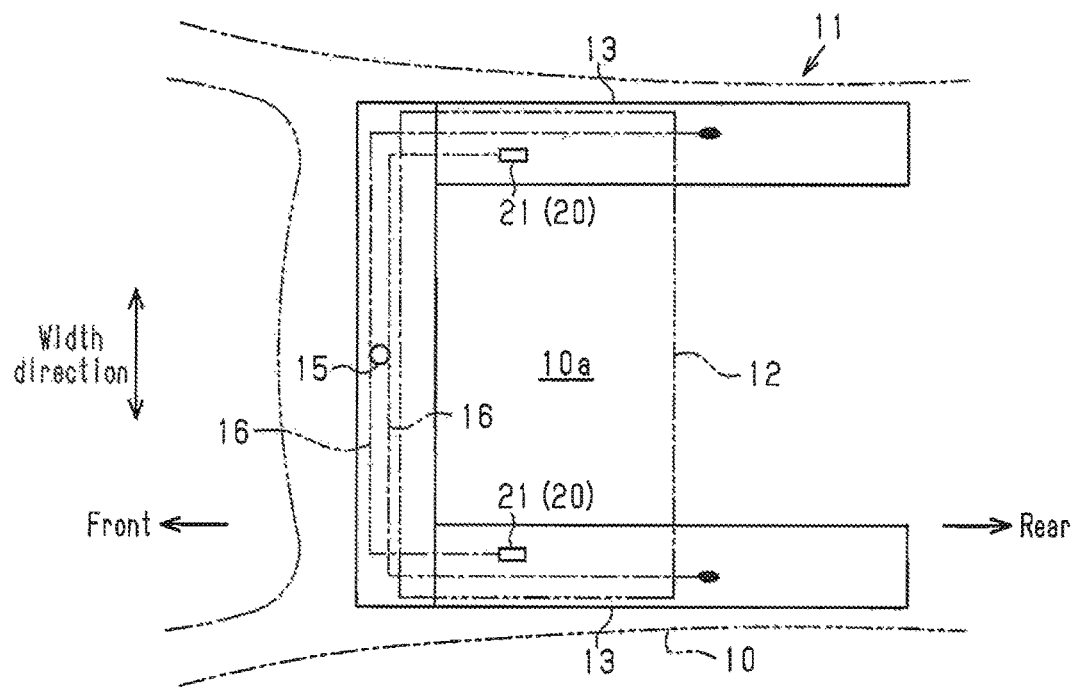
FIG. 2 is a plan view illustrating the configuration of the sunroof apparatus for the vehicle of the first embodiment.

Next, a configuration of the sunroof apparatus 11 related to, for example, the open and close operation of the movable panel 12 will be described. As illustrated in FIG. 2, guide rails 13 each extending substantially along the front-and-rear direction are arranged as a pair at respective vehicle width-direction edge portions of the opening 10a, that is, at edge portions of the opening 10a in the width direction of the vehicle. A function member 20 is guided and supported by each of the guide rails 13 in a movable manner along the extending direction of the guide rails 13. The movable panel 12 is connected to and supported by both of the function members 20 in a state of being spanned over between the function members 20. As the function members 20 move along the extending direction of the guide rails 13 (the front-and-rear direction), the function members 20 cause the movable panel 12 to perform the tilt-up operation or the slide operation.

An electric motor 15 serving as an electric drive source and including, for example, an output gear, is provided at a front side of the vehicle relative to both the guide rails 13. The electric motor 15 is connected to the function members 20 via respective drive belts 16 provided as a pair and each including a substantially belt shape, and the electric motor 15 causes both of the function members 20 to move at the same time along the extending direction of the guide rails 13.

Figure 3A:
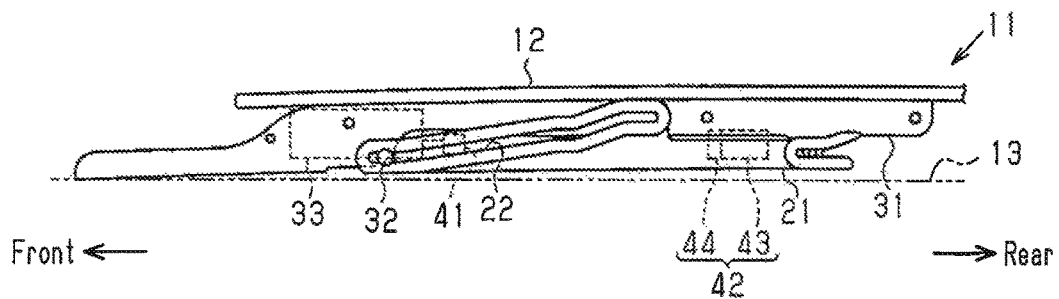
FIG. 3A is a side view illustrating the configuration of the sunroof apparatus for the vehicle of the first embodiment, which shows a fully closed state of a movable panel.
Figure 3B:
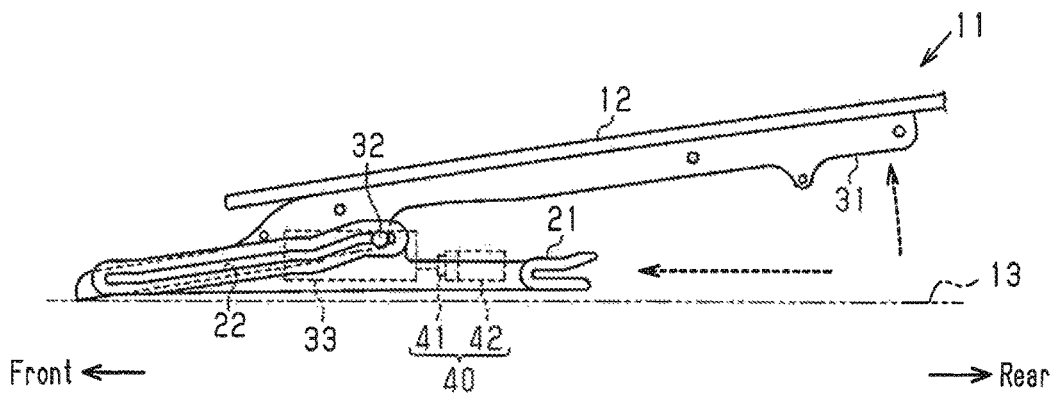
FIG. 3B is a side view illustrating the configuration of the sunroof apparatus for the vehicle of the first embodiment, which shows a state in which a drive show has moved towards a front side of a vehicle.

As illustrated in FIGS. 3A and 3B, a drive shoe 21 serving as a sliding member is supported at each of the guide rails 13 to be slidable along the extending direction of the guide rail 13. Each of the function members 20, at the corresponding drive shoe 21, is connected to the drive belt 16 to move integrally with the drive belt 16. Each drive shoe 21 is provided with a raising and lowering guide hole 22 opened in the width direction of the vehicle and including a substantially elongated hole shape. The raising and lowering guide hole 22 is basically inclined downwardly towards the front side of the vehicle. On the other hand, a support bracket 31 is fixed to a bottom surface of each of vehicle width-direction edge portions of the movable panel 12, that is, each of edge portions of the movable panel 12 in the width direction of the vehicle. The function members 20 support the movable panel 12 at the respective support bracket 31. A front end portion of each support bracket 31 is supported at the guide rail 13 to be slidable along the extending direction of the guide rail 13. A raising and lowering guide pin 32 which is to be inserted in the corresponding raising and lowering guide hole 22 is provided at each support bracket 31 to protrude in the width direction of the vehicle.

As illustrated in FIG. 3A, in a fully closed state of the movable panel 12, the raising and lowering guide pin 32 is positioned at a front end portion of the raising and lowering guide hole 22. Thus, in this state, when the drive shoe 21 moves relative to the support bracket 31 towards the front side of the vehicle, the support bracket 31 rotates in the counterclockwise direction in the drawing so that a rear portion of the support bracket 31 moves up relative to a front portion of the support bracket 31 while the support bracket 31 raising the raising and lowering guide pin 32 along the raising and lowering guide hole 22. Thus, the movable panel 12 performs the tilt-up operation to be in the tilt-up state. In contrast, in the tilt-up state of the movable panel 12, when the drive shoe 21 moves towards a rear side of the vehicle relative to the support bracket 31, the support bracket 31 rotates in the clockwise direction in the drawing so that the rear portion of the support bracket 31 moves downwardly relative to the front portion of the support bracket 31 while the support bracket 31 lowering the raising and lowering guide pin 32 along the raising and lowering guide hole 22. Thus, the movable panel 12 performs the tilt-down operation to be in the fully closed state.

When the movable panel 12 is shifting between the fully closed state and the tilt-up state, the support bracket 31 is configured to be restricted from moving in the front-and-rear direction by an appropriate front check mechanism.

A driven shoe 33 is supported at each guide rail 13 to be slidable along the extending direction of the guide rail 13. The driven shoe 33 is connected so as to move integrally with the corresponding support bracket 31 in a state of allowing the support bracket 31 to perform the above-described rotation (that is, the tilt operation of the movable panel 12). A rotary cam 41 is supported at a rear end of each driven shoe 33 to be rotatable about an axis line substantially along the front-and-rear direction. On the other hand, a fixed cam 42 including a substantially cylindrical shape is supported at each drive shoe 21 at the rear side of the vehicle relative to the rotary cam 41 to be substantially coaxial with the rotary cam 41. The fixed cam 42 includes a first fixed cam 43 and a second fixed cam 44 which are overlapped with each other in the front-and-rear direction. The rotary cam 41 and the fixed cam 42 configure a check mechanism 40.

Figure 4:
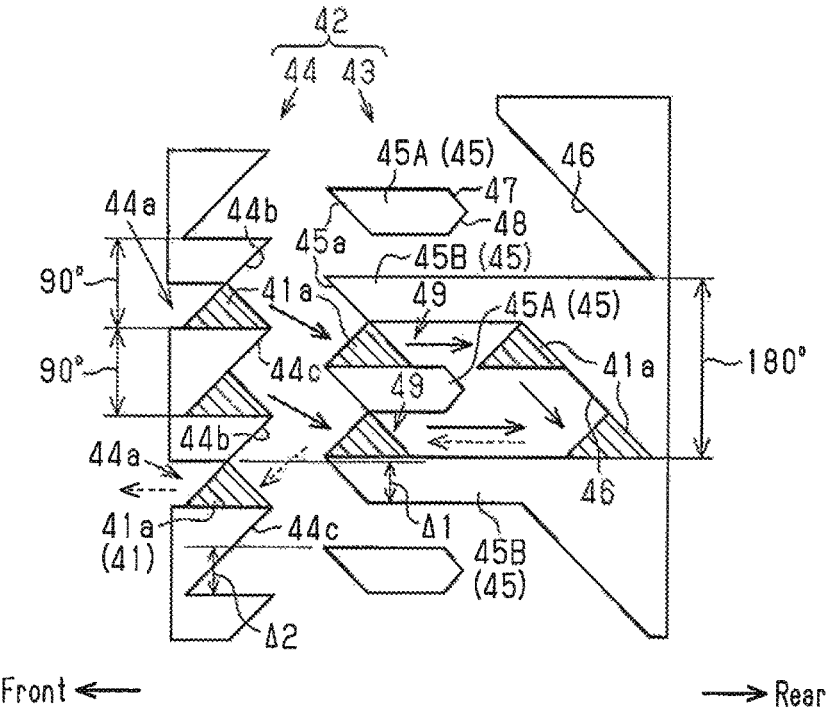
FIG. 4 is an explanation diagram showing an operation of the check mechanism, in which the check mechanism is developed or opened in a circumferential direction.

As illustrated in FIG. 4, the rotary cam 41 includes a pair of rotary cam teeth 41a. The rotary cam teeth 41a are arranged at an outer peripheral portion of the rotary cam 41 to face each other in a radial direction (that is, at every 180 degrees). The rotary cam teeth 41a protrude outwardly in the radial direction. Each of the rotary cam teeth 41a includes a substantially isosceles triangular shape of which the base extends in the front-and-rear direction (the direction in which the guide rails 13 extends). Each of the rotary cam teeth 41a extends in a circumferential direction centered on the axis line of the rotary cam 41 in a range of an angle (45 degrees in the present embodiment) which is smaller than a half angle (90 degrees in the present embodiment) of a predetermined angle (180 degrees in the present embodiment).

On the other hand, the first fixed cam 43 includes plural ribs 45 (four pieces) protrudingly provided at an inner peripheral portion of a front end portion (an opening end portion) of the first fixed cam 43 and extending in the front-and-rear direction (the extending direction of the guide rails 13), in a streaky configuration. The ribs 45 are arranged about an axis line of the first fixed cam 43 at every a half angle (90 degrees) of the predetermined angle. Each of the ribs 45 extends in the circumferential direction centered on an axis line of the fixed cam 42 in a range of an angle (45 degrees in the present embodiment) which is smaller than a half angle (90 degrees) of the predetermined angle. A front end surface of each of the ribs 45 forms a fixed cam tooth 45a which is inclined to conform with a facing surface of the corresponding rotary cam tooth 41a advancing to enter the fixed cam 42. The first fixed cam 43 includes initialization guide open portions 49 communicating in the front-and-rear direction and formed between the neighboring ribs 45 in a circumferential direction about the axis line of the first fixed cam 43. Each of the initialization guide open portions 49 extends in the range of the angle (45 degrees) which is smaller than a half angle (90 degrees) of the predetermined angle in a circumferential direction about the axis line of the fixed cam 42.

The first fixed cam 43 forms plural (two) first initialization guides 46 serving as initialization guides inclined to be substantially parallel with the fixed cam teeth 45a at a rear side relative to the ribs 45. Each of the first initialization guides 46 includes one (which will be hereinafter referred to also as "rib 45A") of ribs 45 in the circumferential direction about the axis line of the fixed cam 42. Also, the deepest portion and the shallowest portion of each of the first initialization guides 46 are continuous, in the front-and-rear direction, respectively with the ribs 45 (which will be hereinafter referred to also as "ribs 45B") neighboring the rib 45A. That is, the first initialization guide 46 combined with one of the fixed cam teeth 45a (the rib 45B) extends in a range of the predetermined angle (180 degrees) in the circumferential direction about the axis line of the fixed cam 42. The first initialization guide 46 is, in the front-and-rear direction, in communication with both the initialization guide open portions 49 neighboring the rib 45A included in the first initialization guide 46.

A rear end surface of each of the ribs 45A forms a recovery guide 47 and a second initialization guide 48, in such a manner that both sides of the rear end surface are inclined so that an intermediate portion of the rear end surface in the circumferential direction centered at the axis line of the fixed cam 42 protrudes rearward.

A pair of open portions 44a communicating along an axis line direction of the second fixed cam 44 direction is provided at an inner peripheral portion of the second fixed cam 44 such that the open portions 44a face each other in a radial direction (that is, provided at every 180 degrees). A rear end portion, at the upper side when viewed in the diagram, of each of the open portions 44a is inclined to be gradually widened towards a rear end, thereby forming a guide portion 44b. Each of the open portions 44a communicating over the entire length of the second fixed cam 44 in the axis line direction extends in the circumferential direction about the axis line of the fixed cam 42 in the range of the angle (45 degrees) equal to the fixed cam tooth 45a. The open portion 44a including the guide portion 44b extends in a range of a half angle (90 degrees) of the predetermined angle in the circumferential direction about the axis line of the fixed cam 42. A circumferentially intermediate portion of the fixed cam tooth 45a (the rib 45B) faces or opposes, in the front-and-rear direction, the deepest portion (a front end) of each of the guide portion 44b. A phase difference Δ1 corresponding to a predetermined angle which is smaller than the angle (45 degrees) of the range equal to the fixed cam tooth 45a is set between the deepest portion (the front end) of the guide portion 44b and an end portion (a rear end) of the fixed cam tooth 45a, the end portion which is positioned at the rearmost side.

Further, engagement portions 44c are formed as a pair at the rear end portion (an opening end portion) of the second fixed cam 44 between both the open portions 44a in the circumferential direction. Each of the engagement portions 44c is inclined towards the front side of the vehicle as it goes from the open portion 44a towards the guide portion 44b. Each of the engagement portions 44c extends in the circumferential direction about the axis line of the fixed cam 42 in the range of a half angle (90 degrees) of the predetermined angle. An end portion of the fixed cam tooth 45a (the rib 45A), the end portion which is positioned at the forefront side of the fixed cam tooth 45a faces or opposes, in the front-and-rear direction, a circumferentially intermediate portion of each of the engagement portions 44c. A phase difference Δ2 corresponding to a predetermined angle which is larger than the angle (45 degrees) of the range equal to the fixed cam tooth 45a is set between the deepest portion (a front end) of the engagement portion 44c and an end portion (a front end) of the fixed cam tooth 45a, the end portion which is positioned at the foremost side. An angle (=Δ1+Δ2) obtained by adding the phase difference Δ1 and the phase difference Δ2 matches a half angle (90 degrees) of the predetermined angle.

The guide portions 44b, the fixed cam teeth 45a of the ribs 45A, the engagement portions 44c and the fixed cam teeth 45a of the ribs 45B form an engagement and disengagement switch guide. In the fully closed state of the movable panel 12 (refer to FIG. 3A), the rotary cam 41 and the fixed cam 42 are separated from each other in the front-and-rear direction. At this time, the rotary cam teeth 41a are at an advancement and retraction rotary position at which the rotary cam teeth 41a coincide with an angular position of the open portions 44a.

Here, in the fully closed state of the movable panel 12, when the drive shoe 21 is moved towards the front side of the vehicle relative to the support bracket 31 (and the driven shoe 33), the movable panel 12 performs the tilt-up operation as described before. At this time, in a case where the fixed cam 42 moving together with the drive shoe 21 towards the front side of the vehicle has not reached the rotary cam 41, the movable panel 12 performs the tilt-down operation when the drive shoe 21 is moved towards the front side of the vehicle relative to the support bracket 31 (and the driven shoe 33) thereafter, as described above.

On the other hand, in a case where the fixed cam 42 moving together with the drive shoe 21 towards the front side of the vehicle has reached the rotary cam 41 as illustrated in FIG. 3B, the rotary cam teeth 41a which are in the advancement and retraction rotary position pass through the open portions 44a and are pushed by the fixed cam teeth 45a because paths for advancing to the fixed cam teeth 45a are opened by the open portions 44a as illustrated in FIG. 4. At this time, in a case where the first initialization guides 46 have not reached the rotary cam teeth 41a, the rotary cam teeth 41a are guided by the fixed cam teeth 45a and are rotated by the phase difference Δ1. That is, the rotary cam teeth 41a (the rotary cam 41) rotate to a first rotary position. The stoppage of the drive shoe 21 in a state where the first initialization guides 46 have not reached the rotary cam 41 (for example, the stoppage of the drive shoe 21 in a state where the range of the rib 45 in the front-and-rear direction reaches the rotary cam 41) is conducted, for example, via a drive control of the electric motor 15 by an electronic control unit including a microcomputer. Accordingly, thereafter, when the fixed cam 42 is moved together with the drive shoe 21 towards the rear side of the vehicle, the paths of the rotary cam teeth 41a to the fixed cam teeth 45a (the paths to retract from the fixed cam teeth 45a) are closed or blocked by the engagement portions 44c.

Therefore, when the fixed cam 42 is moved together with the drive shoe 21 towards the rear side of the vehicle so that the movable panel 12 performs the slide operation (that is, the open operation), the rotary cam teeth 41a are guided by the engagement portions 44c and come to engage with the engagement portions 44c while rotating by the phase difference Δ2 as illustrated in FIG. 4. That is, the rotary cam teeth 41a (the rotary cam 41) rotate to a second rotary position. A state of the check mechanism 40 in which the rotary cam teeth 41a have engaged with the engagement portions 44c, via the blockage of the paths to the fixed cam teeth 45a by the engagement portions 44c, is referred to as "an engaged state". In the engaged state of the check mechanism 40, the driven shoe 33 supporting the rotary cam 41 starts to move together with the support bracket 31 towards the rear side of the vehicle. At this time, the front check mechanism allows the support bracket 31 to move towards the rear side of the vehicle together with the driven shoe 33. Accordingly, the moveable panel 12 performs the open operation until the movable panel 12 comes to be in a fully open state while keeping the tilt-up state.

In the open state of the movable panel 12, the movable panel 12 is configured to perform the close operation with the tilt-up state maintained, without via the check mechanism 40. Thus, at this time, the check mechanism 40 remains in the engaged state. In association with the close operation of the movable panel 12, when the movable panel 12 comes close to the earlier state in which the open operation was started, the front check mechanism restricts the support bracket 31 from moving towards the front side of the vehicle together with the driven shoe 33. Accordingly, the fixed cam 42 moves towards the front side of the vehicle relative to the rotary cam 41 that is restricted from moving towards the front side of the vehicle together with the driven shoe 33. At this time, as illustrated in FIG. 4, the fixed cam teeth 45a push the rotary cam teeth 41a, and thus the rotary cam teeth 41a are guided by the fixed cam teeth 45a and rotate by a complementary angle of the phase difference Δ2 (=90 degrees−Δ2=Δ1). The rotary position of the rotary cam teeth 41a at this time is referred to as "a release preparation position". Accordingly, thereafter, when the fixed cam 42 is moved together with the drive shoe 21 towards the rear side of the vehicle, the paths of the rotary cam teeth 41a to the fixed cam teeth 45a (the paths for retracting from the fixed cam teeth 45a) are opened by the open portions 44a while the rotary cam teeth 41a are being guided and rotated, that is, guided be rotated, by the guide portions 44b so as to reach the advancement and retraction rotary position. Consequently, the rotary cam 41 releases the engagement with the second fixed cam 44 (the fixed cam 42) while allowing the rotary cam teeth 41a to pass through the open portions 44a. A state of the check mechanism 40 in which the rotary cam teeth 41a have disengaged with the engagement portions 44c, via the opening of the paths to the fixed cam teeth 45a by the open portions 44a, is referred to as "a disengaged state". Then, the rotary cam 42 moves together with the drive shoe 21 towards the rear side of the vehicle while the rotary cam 41 and so force remaining. At this time, the raising and lowering guide pin 32 is guided to lower along the raising and lowering guide hole 22, and accordingly the movable panel 12 performs the tilt-down operation thereby to be in the fully closed state.

Next, an operation of the present embodiment will be described. First, as illustrated in FIG. 4, it is assumed that the state immediately after the rotary cam teeth 41a having passed through the open portions 44a were pushed by the fixed cam teeth 45a is established (the state in which the rotary cam teeth 41a are positioned at the initialization guide open portions 49 at the upper side relative to the respective ribs 45A when viewed in the diagram, that is, the state in which the rotary cam teeth 41a are positioned at the first rotary position). In this state, the drive shoe 21 is assumed to be moved further towards the front side of the vehicle relative to the support bracket 31 (and the driven shoe 33). At this time, because the first initialization guides 46 of the fixed cam 42 moving towards the front side of the vehicle together with the drive shoe 21 reach the rotary cam teeth 41a (so-called "being bottomed or being attached the bottom"), the rotary cam teeth 41a are pushed by and guided by the first initialization guides 46, and rotate to the deepest portions of the first initialization guides 46 at once. At this time, the rotary cam teeth 41a are positioned at the initialization guide open portions 49 (the release preparation position) at the lower side relative to the respective ribs 45A when viewed in the drawing.

On the other hand, it is assumed that a state is established in which the rotary cam teeth 41a positioned at the first rotary position rotate for some reason and are positioned at the initialization guide open portions 49 at the lower side relative to the respective ribs 45A when viewed in the drawing. In this state, the drive shoe 21 is assumed to be moved further towards the front side of the vehicle relative to the support bracket 31 (and the driven shoe 33). At this time, the deepest portions of the first initialization guides 46 of the fixed cam 42 moving towards the front side of the vehicle together with the drive shoe 21 reach the rotary cam teeth 41a directly as they are. The rotary cam teeth 41a are positioned at the initialization guide open portions 49 (the release preparation position) at the lower side relative to the respective ribs 45A when viewed in the drawing.

As described above, regardless of the position of the rotary cam teeth 41a inside the fixed cam 42 (at the initialization guide open portions 49 at the upper side relative to the ribs 45A when viewed in the drawing or at the initialization guide open portions 49 at the lower side relative to the ribs 45A when viewed in the drawing), by moving the drive shoe 21 towards the front side of the vehicle until the first initialization guides 46 reach the rotary cam teeth 41a, the rotary cam teeth 41a come to be positioned at the initialization guide open portions 49 at the lower side relative to the respective ribs 45A. That is, thereafter, by moving the fixed cam 42 together with the drive shoe 21 towards the rear side of the vehicle, the rotary cam teeth 41 disengage with the second fixed cam 44 (the rotary cam 42) in the above-described manner. When the deepest portions of the first initialization guides 46 of the fixed cam 42 reach the rotary cam teeth 41a, the drive shoe 21 is mechanically restricted from moving towards the front side of the vehicle. The electronic control unit may, for example, stop the drive of the electric motor 15 in response to motor lock, which is generated at this time, of the electric motor 15.

It is assumed that the rotary cam teeth 41a which are in the above-described earlier state rotate through the ribs 45A for some reason. At this time, in a case where a rotation amount of the rotary cam teeth 41a is within the range of the recovery guides 47, the rotary cam teeth 41a are guided by the recovery guides 47 and then rotate and recover to the earlier state when the fixed cam 42 moves together with the drive shoe 21 towards the rear side of the vehicle thereafter. That is, when the fixed cam 42 moves as it is together with the drive shoe 21 towards the rear side of the vehicle, the rotary cam teeth 41a engage with the second fixed cam 44 (the fixed cam 42) in the above-described manner.

In addition, for example, it is assumed that the rotary cam teeth 41a are not positioned at the deepest portions of the first initialization guides 46 due to, for example, insufficient rotation of the rotary cam teeth 41a that are pushed and guided by the first initialization guides 46. Also in this case, if at least part of the rotary cam teeth 41a have reached the second initialization guides 48, the rotary cam teeth 41a are pushed and guided by the second initialization guides 48 and rotate to the initialization guide open portions 49 (which correspond to the deepest portions of the first initialization guides 46) at the lower side relative to the respective ribs 45A when viewed in the drawing when the fixed cam 42 moves together with the drive shoe 21 towards the rear side of the vehicle thereafter. That is, when the fixed cam 42 moves as it is together with the drive shoe 21 towards the rear side of the vehicle, the rotary cam teeth 41a releases the engagement with the second fixed cam 44 (the fixed cam 42) in the above-described manner.

As described above, according to the present embodiment, the effects described below are obtained.

(1) In the present embodiment, in a case where both of the check mechanisms 40 are in the disengaged state and both of the shoes 21 move relative to the movable panel 12, a posture of the movable panel 12 changes (the tilt operation). On the other hand, in a case where both of the check mechanisms 40 are in the engaged state and both of the shoes 21 move integrally with the movable panel 12, the movable panel 12 moves while maintaining its posture (the open operation while being kept in the tilt-up state). In addition, it is assumed that both of the check mechanisms 40 are in states which differ from each other (a one-side-engaged state) for some reason. In this case, when both of the drive shoes 21 are moved so that both of the rotary cams 41 having advanced and entered into the respective fixed cams 42 advance further into the fixed cams 42, both of the rotary cams 41 are pushed by the respective first initialization guides 46 and the rotary cams 41 reach the release preparation position together with each other. Consequently, in this state, when both of the drive shoes 21 are moved to allow both of the rotary cams 41 to retract, the rotary cams 41 are pushed by the respective guide portions 44 (the engagement and disengagement switch guide) and thus the rotary cams 41 are guided and rotated such that both of the rotary cams 41 reach the advancement and retraction rotary position together with each other, that is, such that both of the check mechanisms 40 come to be in the disengaged state together with each other. In other words, both of the check mechanisms 40 come to be in the disengaged state in synchronization with each other. Thus, for example, at a dealer to which a vehicle is brought due to an abnormal operation, a normal operation can be restored extremely easily only by moving both of the drive shoes 21 manually or electrically. For example, the normal operation can be restored without performing disassembly operation and/or rework operation as in a conventional configuration.

(2) In the present embodiment, each of the fixed cams 42 includes the second initialization guides 48 arranged between the fixed cam teeth 45a (the engagement and disengagement switch guide) and the first initialization guides 46 in the front-and-rear direction. In a case where each of the rotary cams 41, which is guided to be rotated by the first initialization guide 46, rotates reversely in a state of not having reached the release preparation position, the second initialization guides 48 push the respective rotary cams 41 and guide the rotary cams 41 to be rotated so that the rotary cams 41 reach the release preparation position. Therefore, even if the guiding and rotating of the rotary cams 41 to the release preparation position by the first initialization guides 46 is incomplete at either one of the rotary cams 41, by moving thereafter both of the drive shoes 21 so that the both of the rotary cams 41 are rotated reversely, both of the rotary cams 41 are pushed by the respective second initialization guides 48 so that both of the rotary cams 41 are guided to rotate so as to reach the release preparation position together with each other. Thus, both of the check mechanisms 40 are reliably synchronized with each other in the disengaged state.

(3) In the present embodiment, to restore the normal operation, both of the drive shoes 21 are moved forward of the vehicle until the motor lock occurs to the electric motor 15, thereby preventing an electric control from being complicated.

(4) In the present embodiment, in a normal operation for switching the check mechanism 40 from the disengaged state to the engaged state, even in a case where the rotary cam 41 rotates in a manner that a range of the rib 45A in the front-and-rear direction exceeds the rotary cam 41, the rotary cam 41 is guided and rotated by the recovery guides 47 during the reverse rotation occurring thereafter, and accordingly being recovered to the position of the original initialization guide open portions 49.

(5) In the present embodiment, in the normal operation for switching the states (the disengaged state, the engaged state) of the check mechanism 40, there is no need for causing the electric motor 15 to generate the motor lock unnecessarily as long as, basically, the range of the rib 45 in the front-and-rear direction reaches the rotary cam 41.

(6) In the present embodiment, each of the rotary cam teeth 41a includes the isosceles triangular shape, and thus a size in the front-and-rear direction is reduced compared to, for example, an isosceles trapezoid shape of a conventional configuration, thereby increasing an amount of opening by the movable panel 12.

(7) In the present embodiment, for example, at an assembling work of the sunroof apparatus 11 at a vehicle plant, in a case it is limited such that the assembling work is to be conducted in a state where the rotary cam 41 of each of the check mechanisms 40 has been inserted in the corresponding fixed cam 42, both of the check mechanisms 40 can be brought into the disengaged states with each other by performing the initialization work without confirming or checking, for example, visually, the states (the disengaged state and the engagement state) of the check mechanisms 40 after completion of the assembling work. Accordingly, the confirming or checking work can be omitted at the vehicle plant, for example.

Second Embodiment

A second embodiment of the sunroof apparatus for a vehicle will be described hereafter. The second embodiment includes configurations in which changes are made to the fixed cam of the check mechanism of the first embodiment, therefore detailed explanations of similar portions will be omitted. In the configurations of the second embodiment, the configuration including a similar function to the first embodiment is assigned with a reference numeral of which the numbers below the tens place are identical to the first embodiment.

Figure 5:
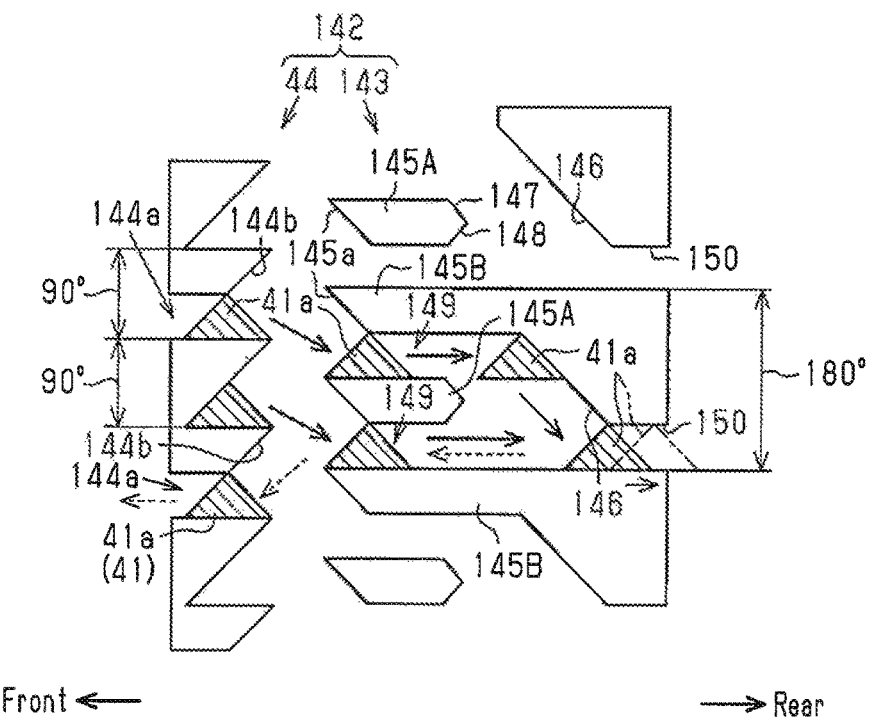
FIG. 5 is an explanation diagram showing an operation of a check mechanism of a sunroof apparatus for a vehicle of a second embodiment, in which the check mechanism is developed or opened in a circumferential direction.

As illustrated in FIG. 5, a fixed cam 142 of the present embodiment includes a first fixed cam 143 based on the first fixed cam 43. The first fixed cam 143 includes a through hole 150 formed at a rear end portion of the first fixed cam 143 so as to open in the front-and-rear direction to correspond to an initialization guide open portion 149 (that is, the release preparation position of the rotary cam teeth 41) at the lower side relative to a rib 145A when viewed in the drawing. The rib 145A is one of the rib 145A and a rib 145B which are neighboring each other. The through holes 150 are provided as a pair to face each other in a radial direction (that is, at every predetermined angle (180 degrees)). In addition, each of the through holes 150 extends in the range of the angle (45 degrees) which is equivalent to the initialization guide open portion 49 in a circumferential direction about an axis line of the fixed cam 142.

As drawn with the alternate long and two short dashes lines in FIG. 5, when the rotary cam teeth 41a, which have been guided and rotated by first initialization guides 146 and thus reached the release preparation position, further advance, the through holes 150 allow at least part of the rotary cam teeth 41a to pass through. As described above, the rotary cam teeth 41a passing the through holes 150 are at the release preparation position. Thus, in this state, when both of the drive shoes 21 are moved to allow both of the rotary cams 41 to retract, the guiding and rotating is performed by guide portions 144b such that the advancement and retraction rotary position is reached.

Figure 6:
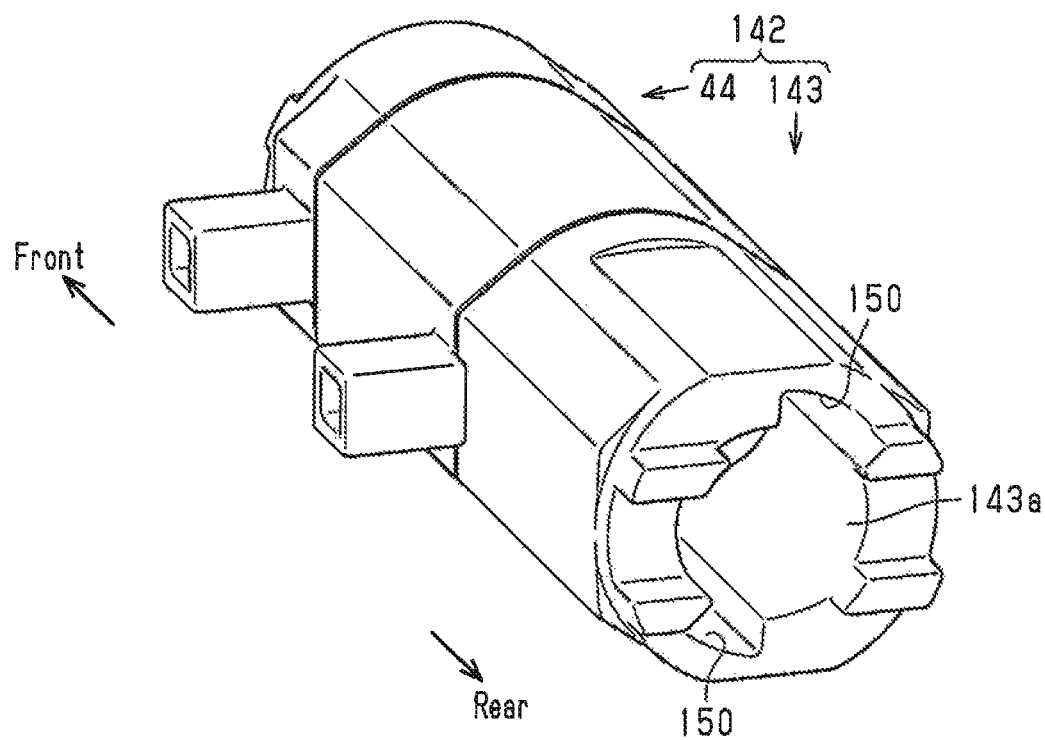
FIG. 6 is a perspective view illustrating a fixed cam.
Figure 7:
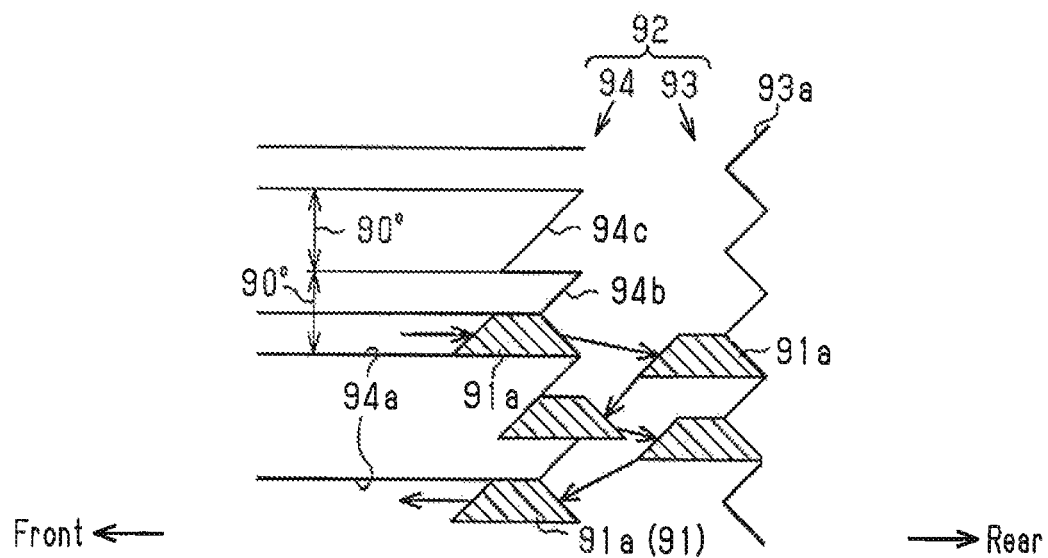
FIG. 7 is an explanation diagram showing an operation of a check mechanism of prior art, in which the check mechanism is developed in a circumferential direction.

As illustrated in FIG. 6, both of the through holes 150 are arranged at an obliquely right upper side and an obliquely left lower side, respectively, towards the front side of the vehicle. An inner wall surface 143a of the first fixed cam 143 basically opens in the front-and-rear direction in a substantially ellipse or oval shape. Thus, the portion of the rotary cam 41 other than both of the rotary cam teeth 41a does not interfere with the first fixed cam 143. That is, the advancement of the rotary cam teeth 41a is not blocked by the first fixed cam 143 until at least portion of each of the rotary cam teeth 41a, which are at the release preparation position, passes the first fixed cam 143.

As described in detail, according to the present embodiment, the effects described below are obtained in addition to the effects similar to the first embodiment.

(1) In the present embodiment, when both of the drive shoes 21 are moved to allow each of the rotary cams 41, which has reached the release preparation position due to the guiding and rotating by the first initialization guides 146, to further advance, at least part of each of the rotary cams 41 passes the corresponding through holes 150 and passes through the fixed cam 142. Accordingly, even in a case where foreign material including sand and/or dust enters inside each of the fixed cams 142, the foreign material is pushed by each of the rotary cams 41 (the rotary cam teeth 41a) passing through the through holes 150, and thus can be discharged from the through holes 150 to the outside of the fixed cams 142. Consequently, a defective operation of the check mechanisms 40 can be prevented from occurring due to that the foreign material accumulates in the fixed cams 142 in excess of a predetermined amount.

(2) In the present embodiment, one of the through holes 150 is arranged at the lower portion of the fixed cam 142, the lower portion where the foreign material is likely to accumulate, and accordingly the foreign material is discharged to the outside of each fixed cam 142 more efficiently.

The aforementioned embodiments may be changed as follows.

In the second embodiment, a range of the rotational cam tooth 41a (the rotary cam 41) which passes through the fixed cam 142 via the through hole 150 is arbitrary. For example, the entire rotary cam tooth 41a may pass through the fixed cam 142. Alternatively, one or two of the apexes of the isosceles triangular shape of the rotary cam tooth 41a may pass through the fixed cam 142.

In any cases, it is ideal that the range of the rotary cam tooth 41a (the rotary cam 41) passing the through hole 150 and then passing through the fixed cam 142 is controlled by an appropriate mechanical lock portion restricting the movement of the drive shoe 21. For example, the mechanical lock portion may restrict the rotary cam 41 and the fixed cam 142 from moving relative to each other with the use of a direct or indirect contact of the rotary cam 41 and the fixed cam 142 with each other. Alternatively, the mechanical lock portion may be a stopper piece formed at an inner wall surface of the through hole 150 in a protruding manner such that the rotary cam tooth 41a engages directly with the stopper piece.

In each of the aforementioned embodiments, the number and arrangement of rotary cam teeth of the rotary cam are arbitrary. In this case, for example, fixed cam teeth of the fixed cam may be arranged according to an angular range in which the rotary cam teeth are formed.

In each of the aforementioned embodiments, relations of arrangement of the rotary cam 41 and the fixed cam 42, 124, and the driven shoe 33 (the movable panel 12) and the drive shoe 21 may be inversed. That is, the fixed cam 42, 142 may be provided at the driven shoe 33, and the rotary cam 41 may be provided at the drive shoe 21.

In each of the aforementioned embodiments, the second initialization guide 48, 148 may be omitted.

In each of the aforementioned embodiments, the recovery guide 47, 147 may be omitted.

In each of the aforementioned embodiments, relations of arrangement of the raising and lowering guide hole 22 and the raising and lowering guide pin 32, and the drive shoe 21 and the support bracket 31 may be inverted. That is, the raising and lowering guide pin 32 may be provided at the drive shoe 21, and a rising and lowering guide hole which is displaced in a direction opposite to the raising and lowering guide hole 22 may be provided at the support bracket 31.

EXPLANATION OF REFERENCE NUMERALS

10 . . . roof, 10a . . . opening, 12 . . . movable panel, 13 . . . guide rail, 15 . . . electric motor (electric drive source), 21 . . . drive shoe (sliding member), 31 . . . support bracket, 40 . . . check mechanism, 41 . . . rotary cam, 41a . . . rotary cam tooth, 42, 142 . . . fixed cam, 44a, 144a . . . open portion, 44b, 144b . . . guide portion (engagement and disengagement switch guide), 44c . . . engagement portion (engagement and disengagement switch guide), 45, 45A, 45B, 145A, 145B . . . rib, 45a, 145a . . . fixed cam tooth (engagement and disengagement switch guide), 46, 146 . . . first initialization guide (initialization guide), 48, 148 . . . second initialization guide, 150 . . . through hole

The invention claimed is:

1. A sunroof apparatus for a vehicle, the sunroof apparatus comprising:
   a movable panel opening and closing an opening formed at a roof of a vehicle;
   guide rails provided as a pair and respectively provided at edge portions of the opening in a width direction of the vehicle;
   sliding members provided as a pair and respectively linked to edge portions of the movable panel in the width direction of the vehicle, the sliding members driven by an electric drive source to move along the guide rails in a front-and-rear direction of the vehicle, the sliding members changing a posture of the movable panel by moving relative to the movable panel and maintaining the posture of the movable panel by moving integrally with the movable panel;
   check mechanisms each including a rotary cam and a fixed cam, the rotary cams being supported at one of the respective sliding members and the respective edge portions of the movable panel, the fixed cams being supported at the other of the respective sliding members and the respective edge portions of the movable panel;
   each of the rotary cams being supported to be rotatable about an axis line extending in the front-and-rear direction of the vehicle and including an advancement and retraction rotary position set at a predetermined angle about the axis line;
   each of the fixed cams including an engagement and disengagement switch guide configured to switch each of the check mechanisms between an engaged state in which the movable panel and the sliding members are movable integrally with each other and a disengaged state in which the sliding members are movable relative to the movable panel;
   the engagement and disengagement switch guides being configured to allow advancement of the respective rotary cams which are at an advancement and retraction rotary position, the engagement and disengagement switch guides being configured to push the rotary cams which have advanced and to rotate the rotary cams to a first rotary position, the engagement and disengagement switch guides being configured to push the rotary cams which are to retract in a direction opposite to a direction of the advancement and to rotate the rotary cams to a second rotary position, each of the check mechanisms thereby being switched to the engaged state when the corresponding rotary cam rotates by a half angle of the predetermined angle from the advancement and retraction rotary position to the second rotary position;
   the engagement and disengagement switch guides being configured to push the respective rotary cams advancing again from the second rotary position in a direction opposite to a direction of the retraction and to rotate the rotary cams to a release preparation position, the engagement and disengagement switch guides being configured to push the rotary cams which are to retract in the direction opposite to the direction of advancement and to rotate the rotary cams to the advancement and retraction rotary position, each of the check mechanisms thereby being switched to the disengaged state; and
   each of the fixed cams further including an initialization guide configured to push the rotary cam advancing further from the first rotary position and to rotate the rotary cam to the release preparation position.

2. The sunroof apparatus for a vehicle according to claim 1, wherein
   each of the fixed cam includes a second initialization guide arranged between the engagement and disengagement switch guide and the initialization guide in the front-and-rear direction of the vehicle, and
   in a case where each of the rotary cams guided by the initialization guide retracts in the direction opposite to the direction of the advancement in a state where the rotary cam has not reached the release preparation position, the second initialization guide is configured to push the rotary cam and to rotate the rotary cam to the release preparation position.

3. The sunroof apparatus for a vehicle according to claim 1, wherein
each of the fixed cams includes a through hole, and
in association with a further advancement of the rotary cams which have been rotated by the initialization guides to the release preparation position, the through holes allow at least part of the rotary cams to pass through.

* * * * *